(12) United States Patent
Wang et al.

(10) Patent No.: US 9,725,256 B1
(45) Date of Patent: Aug. 8, 2017

(54) AUTOMATIC STAGED OBJECT FEEDING AND DISCHARGING SYSTEM

(71) Applicant: An-Sung Wang, New Taipei (TW)

(72) Inventors: An-Sung Wang, New Taipei (TW); Ching-Chang Wong, New Taipei (TW); Yang-Han Lee, New Taipei (TW)

(73) Assignee: An-Sung Wang, New Taipei (TW)

( * ) Notice: Subject to any disclaimer, the term of this patent is extended or adjusted under 35 U.S.C. 154(b) by 0 days.

(21) Appl. No.: 15/081,942

(22) Filed: Mar. 28, 2016

(51) Int. Cl.
  *B65G 47/34* (2006.01)
  *B65B 37/00* (2006.01)
  *B65G 61/00* (2006.01)
  *B25J 18/04* (2006.01)
  *B25J 15/00* (2006.01)

(52) U.S. Cl.
  CPC .......... *B65G 61/00* (2013.01); *B25J 15/0028* (2013.01); *B25J 18/04* (2013.01)

(58) Field of Classification Search
  CPC ................................ B65G 47/34; B65B 37/00
  USPC ............. 198/463.3, 539, 575; 414/589, 590; 901/7, 8
  See application file for complete search history.

(56) References Cited

U.S. PATENT DOCUMENTS

| | | | | |
|---|---|---|---|---|
| 4,119,211 A * | 10/1978 | Boyer | ............... | H01L 21/67144 198/403 |
| 4,457,662 A * | 7/1984 | Ireland | ................... | B65G 65/00 198/403 |
| 4,576,537 A * | 3/1986 | Inaba | ....................... | B23Q 7/10 414/222.07 |
| 4,782,567 A * | 11/1988 | Kanaya | .................... | B23Q 7/04 29/33 P |
| 4,783,904 A * | 11/1988 | Kimura | ................. | B23P 21/004 198/465.2 |
| 4,843,712 A * | 7/1989 | Hellstern | .............. | B23P 19/001 29/741 |
| 4,928,383 A * | 5/1990 | Kaczmarek | ........... | B23P 21/004 29/711 |
| 5,380,138 A * | 1/1995 | Kasai | .................... | B23P 19/001 221/134 |
| 5,503,516 A * | 4/1996 | Kasai | .................... | B23P 19/001 221/134 |
| 5,692,867 A * | 12/1997 | Kondo | .................. | B23P 19/001 414/268 |
| 5,822,953 A * | 10/1998 | Kagawa | .................. | B65B 5/106 414/758 |
| 6,398,482 B2 * | 6/2002 | Asano | ..................... | B23P 15/26 414/790.3 |
| 7,112,017 B2 * | 9/2006 | Killer | ........................ | B23C 3/18 29/889.7 |
| 7,261,500 B2 * | 8/2007 | Killer | ........................ | B23C 3/18 29/889.7 |
| 7,830,776 B2 * | 11/2010 | Wang | ................. | H05K 13/0408 369/127 |

\* cited by examiner

*Primary Examiner* — Douglas Hess
(74) *Attorney, Agent, or Firm* — Leong C. Lei (57) ABSTRACT

An automatic staged object feeding and discharging system includes a table, feeding device, staged feeding and discharging device and robotic arm; the staged feeding and discharging device has a feeder and distributing device in such a way to adjust a feeding and discharging angle of the distributer in a two-stage manner upon object feeding and discharging, allowing the robotic arm to grip material pieces conveniently, thereby decreasing the cost and increasing the processing speed.

9 Claims, 11 Drawing Sheets

AUTOMATIC STAGED OBJECT FEEDING AND DISCHARGING SYSTEM

TECHNICAL FIELD OF THE INVENTION

The present invention relates to an automatic staged object feeding and discharging system, and more particularly to a feeding and discharging automatic system equipped with a staged feeding and discharging device having a feeder and a distributor, where the distributor is configured to adjust an object feeding and discharging angle in a two-stage formula in such a way to allow a robotic arm to grip material pieces conveniently.

DESCRIPTION OF THE PRIOR ART

Conventional object feeding and discharging apparatuses comprise a table configured with a high platform and low platform, where an object feeding and discharging device is configured between the high and low platforms and inclined from the high platform to low platform. The high platform is configured with an object feeding device having a feeding tube in which a plurality of parts is included, where the feeding tube and thus the parts inside the feeding tube may correspond to the object feeding and discharging device. Furthermore, the low platform is configured with a robotic arm with a six-axis motor capable of oblique angle rotational movement, vertical movement and level movement in such a way that the parts in the object feeding and discharging device can be taken out conveniently by placing the parts inside the object feeding and discharging device and causing the robotic arm to have a oblique angle rotational movement.

Conventional object feeding and discharging automatic apparatuses may achieve the convenient object taking-out, but because the feeding and discharging device is fixed between the high and low platforms only by a single stage (i.e. oblique angle), a robotic arm with a six-axis motor having an oblique angle rotational movement must be used to grip parts inside the feeding and discharging device. However, the robotic arm with a six-axis motor have the effect of an oblique angle rotational movement to take out an object multi-angularly, but the object taking-out time is too long, resulting in a high cost. In addition, the position inconstancy of the objects of the feeding tube always happens while being placed inside the feeding and discharging device, causing the robotic arm with a six-axis motor to take out the objects very imprecisely.

SUMMARY OF THE INVENTION

The present invention proposes a staged object feeding and discharging automatic system, including:

a table, configured with an feeding platform and discharging platform;

a feeding device, configured on the object platform, and having a displacement device and at least one feeding tube therein, each feeding being positioned above the displacement device, at least one feeding tube angle deflection device having an angle deflection angle being configured on the displacement device, and a pouring device being configured on one side of a front end of the feeding device, the pouring device allowing the feeding tube to be in connection therewith;

a staged feeding and discharging device, configured on the discharging platform, and having a feeder and discharger, the feeder being positioned on one end of the feeding platform and corresponding to the pouring device, the feeder being inclined an angle, the distributer being coupled pivotally to the discharging platform, a track being configured inside the distributer, the track being configured with a low separation protrusion, a high separation protrusion being configured on the low separation protrusion, and a wall face having at least one exhaust vent being respectively configured on two side ends of the track;

a robotic arm, configured on one side of said discharging platform, and having a level displacement device and perpendicular displacement device.

DETAILED DESCRIPTION OF THE PREFERRED EMBODIMENTS

Figure 1:
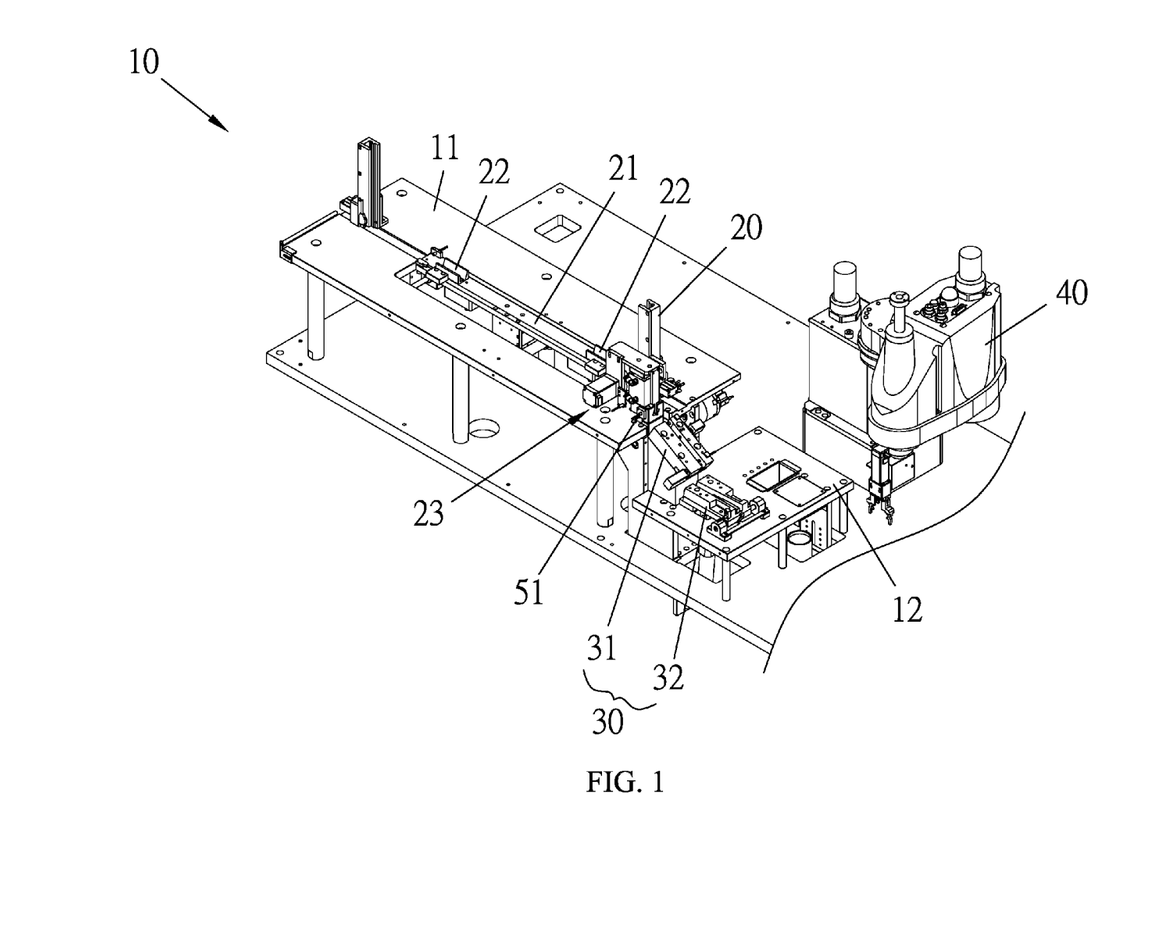
FIG. 1 is a perspective view of the present invention.
Figure 2:
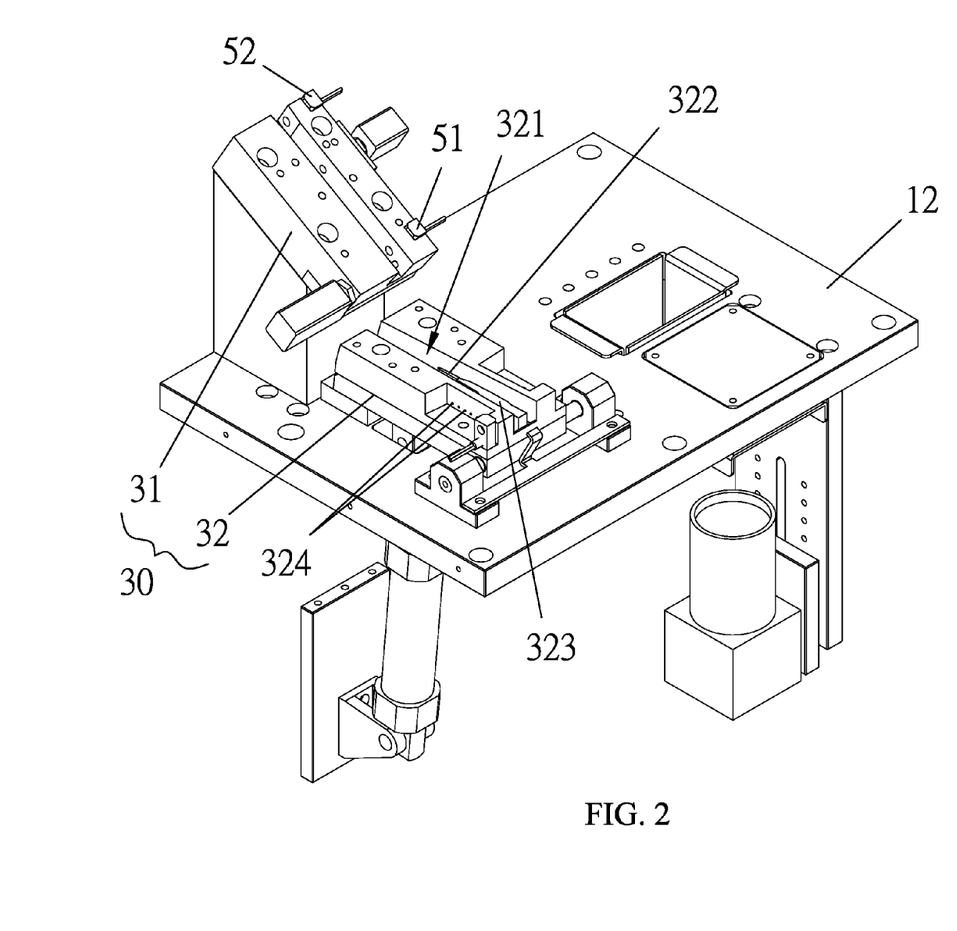
FIG. 2 is a partly perspective view of the present invention.
Figure 3:
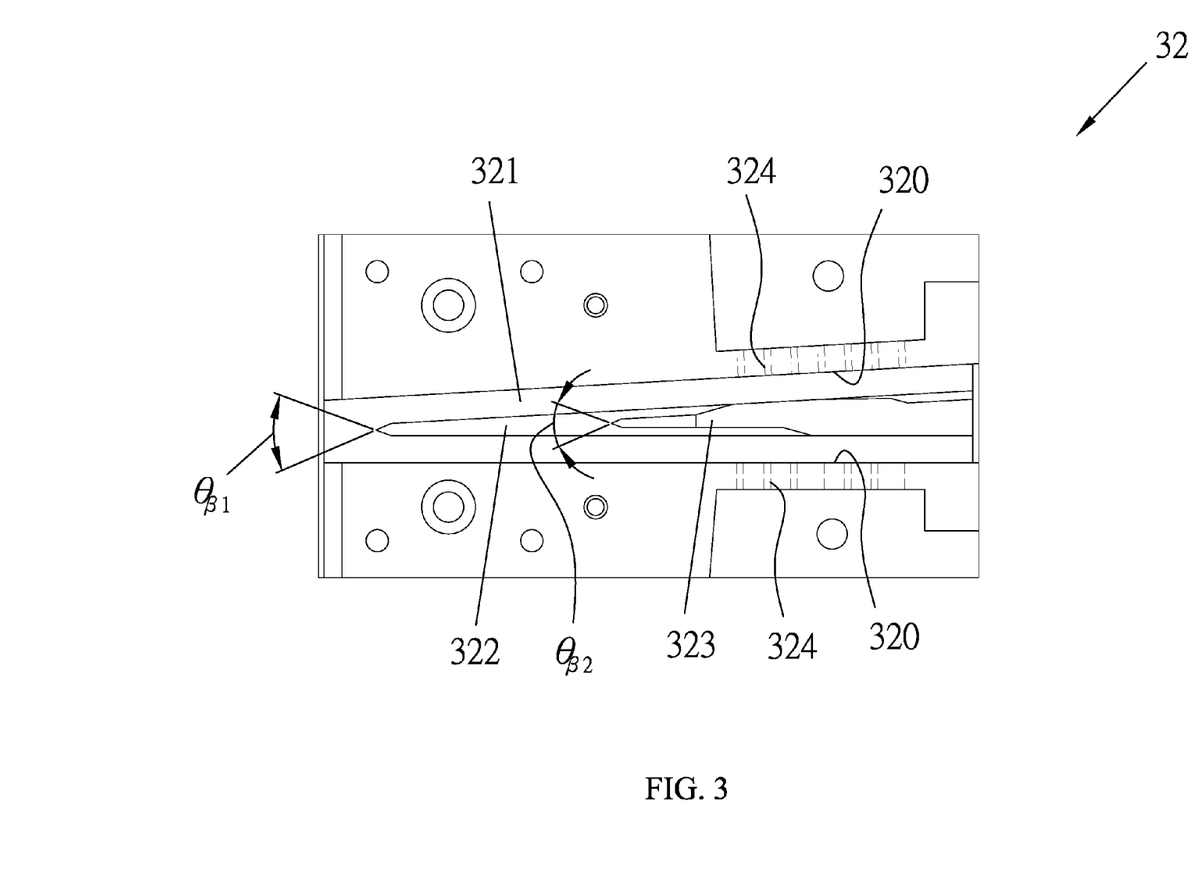
FIG. 3 is a schematically top view of a distributer of the present invention.

Referring to FIGS. 1 and 2, an automation staged object feeding and discharging system of the present invention includes:

a table 10, configured with a feeding platform 11 and discharging platform 12;

a feeding device 20, configured on the feeding platform 11, a displacement device 21 and at least one feeding tube 24 being configured therein, each feeding tube 24 being positioned above the displacement device 21, at least one feeding tube angle deflection device 22 having a deflecting angle $\theta_y$ being configured on the displacement device 21, and one side of the front end of the feeding device being configured with a pouring device 23 configured to be in connection with the feeding tube 24;

a staged feeding and discharging device 30, configured on the discharging platform 12, and having a feeder 31 and distributer 32, the feeder 31 being positioned on one end of the feeding platform 11, corresponding to pouring device 23, and having an inclination angle, and the distributer 32 being coupled pivotally to the discharging platform 12, having a track 321 therein, the track 321 being configured with a low separation protrusion 322, and a high separation protrusion 323 being configured on the low separation protrusion 322, where the low separation protrusion 322 is widen gradually from front to back, the high separation protrusion 323 is configured on the middle section of the low separation protrusion 322 and is widen gradually from front to back, a wall face 320 is respectively configured on the two side ends of the track 321 respectively having at least one exhaust vent, as FIG. 3 shows.

a robotic arm 40, configured on one side of the discharging platform 12, and having level displacement device and perpendicular displacement device.

Figure 4:
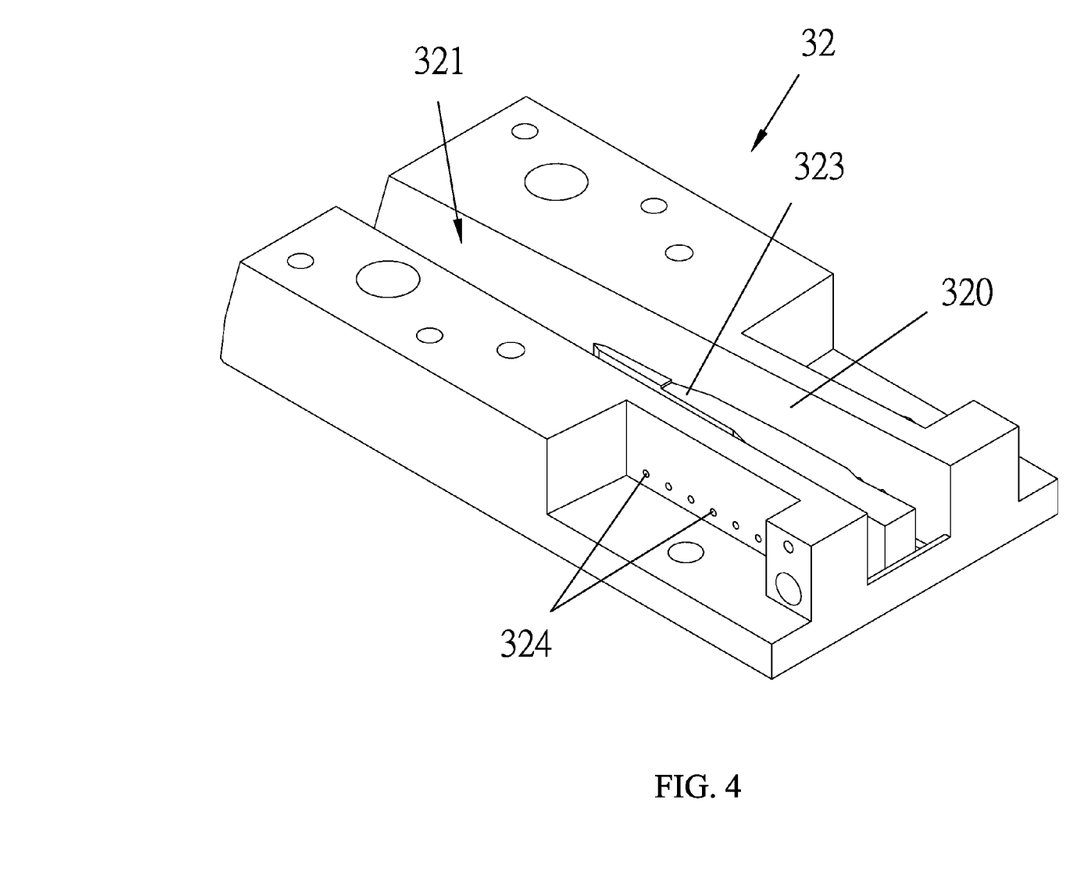
FIG. 4 is a partly perspective view of the distributer of the present invention.

Referring to FIGS. 3 and 4, the low separation protrusion 322 and high separation protrusion 323 being configured in the track 321 of the distributer 32 and the front ends of the low separation protrusion 322 and high separation protrusion 323 respectively having separating angles $\theta_{\beta 1}$ and $\theta_{\beta 2}$ allow a single material piece 25 or two or more than two combined material pieces 25 to be separated after the touch thereof with the protrusions, where the separating angles $\theta_{\beta 1}$ and $\theta_{\beta 2}$ may be in the range from 3 to 8 degrees, and preferably is 4 degrees, enabling the pins positioned on the bottom end of two or more than two combined material pieces 25 can be separated first while touching the low separation protrusion 322, and the partly separated material pieces 25 can further be separated completely while touching the high separation protrusion 323. Furthermore, the negative pressure applied on the exhaust vents 324 configured on the wall face 320 of the track 321 allows the material pieces 25 to be attached to the wall face 320 after the material pieces are separated, thereby preventing the material pieces 25 from shaking unstably in the track 321 and colliding with each other to cause damage after the separation.

Figure 5:
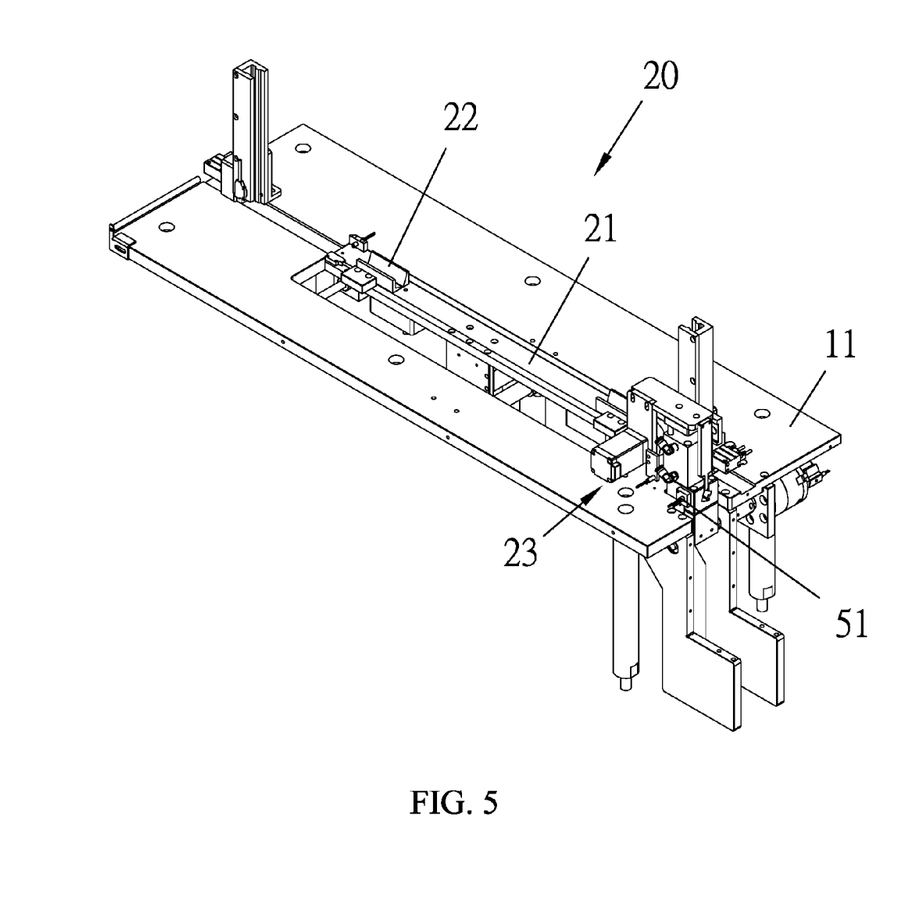
FIG. 5 is a schematically perspective view of a feeding device of the present invention.
Figure 6:
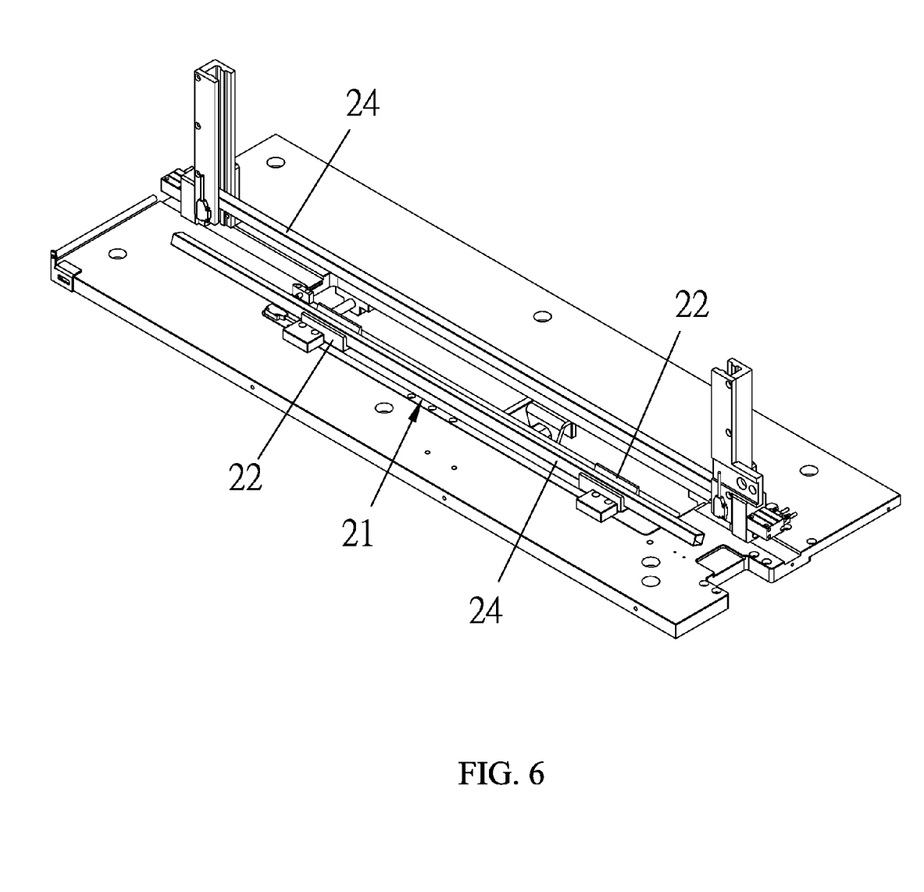
FIG. 6 is a schematically perspective of the feeding device configured with a feeding tube according to the present invention.
Figure 7:
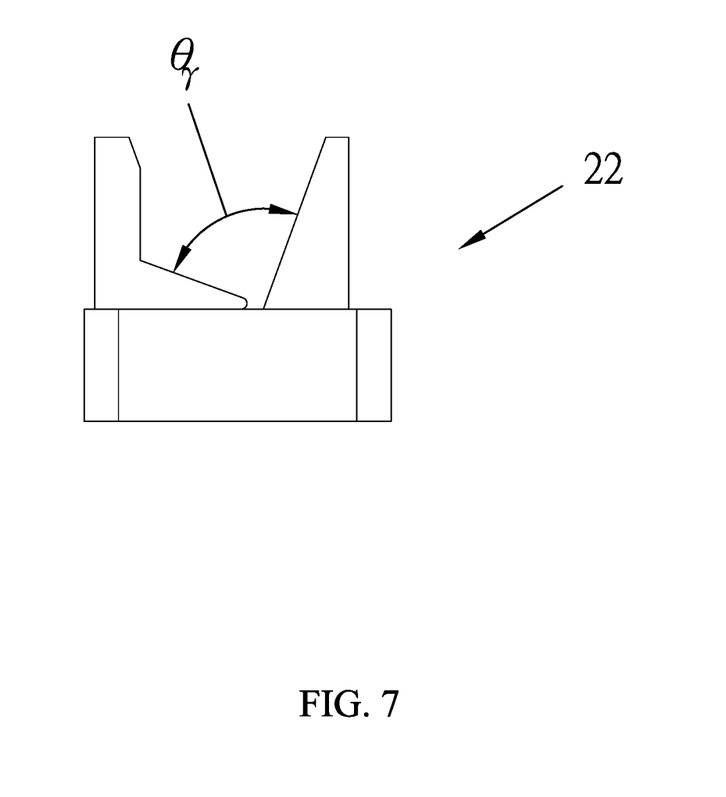
FIG. 7 is a schematic view of a feeding tube angle deflection device having a deflection angle according to the present invention.

Referring FIGS. 5 and 6, the feeding device 20 is configured on the feeding platform 11, the displacement device 21 and at least one feeding tube 24 are configured in the feeding device 20, each feeding tube is further positioned above of the displacement device 21, and the displacement device 21 is configured with at least one angle deflection device 22 having a deflecting angle $\theta_\gamma$ preferably 45 degrees in such a way that the feeding tube 24 can be taken out and moved to another side by moving the displacement device 21 under the feeding tube 24. Furthermore, in order to achieve the convenient placement of material pieces 25 in the feeding tube, they are always placed in the feeding tube 24 in an inclined angle. However, in order to make the material pieces 25 discharge in a normal position, the feeding tube 24 can be rotated by the feeding tube angle deflection device 22 configured on the displacement device 21. Moreover, because the discharging device 23 configured on the one side of the front end of the feeding device can be in connection with the feeding tube 24, the feeding tube 24 can be moved to the pouring device 23 after being taken out by the displacement device 21 to be in connection with the pouring device 23 and further to change the feeding angle $\theta_\alpha$ thereof through the pouring device 23.

Figure 8:
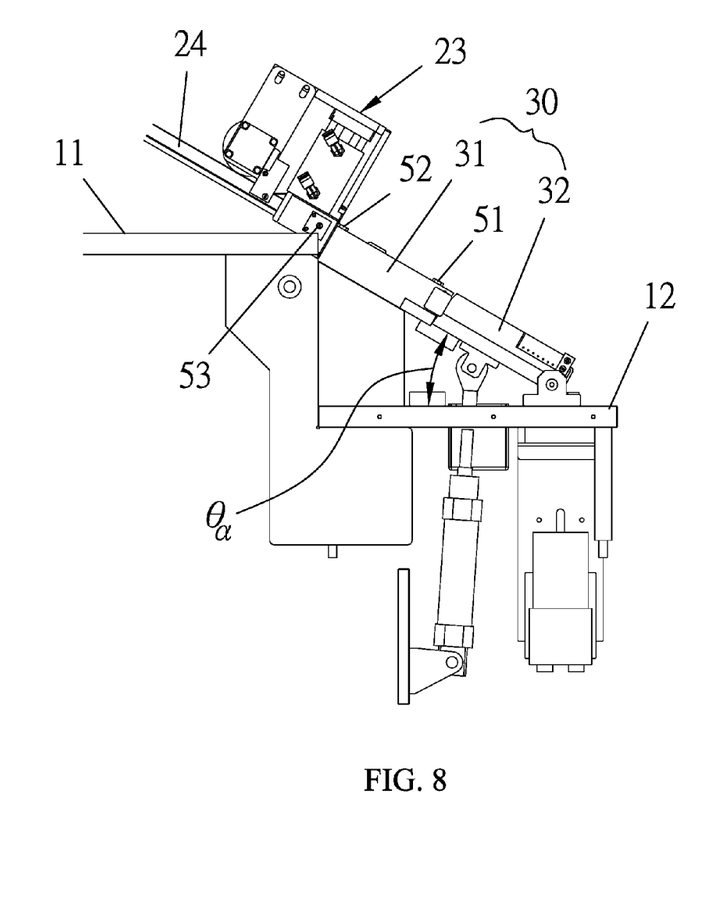
FIG. 8 is a schematic view of the present invention upon object feeding.

Furthermore, referring to FIG. 8, the feeding tube 24 is moved to be in connection with the pouring device 23, and the empty tube detection can then be carried out upon the material piece discharging of the pouring device by configuring a third sensor 53 on one end of the pouring device 23, and whether the material pieces 25 are in the feeder 31 can be detected by configuring a second sensor 52 on one end of the feeder 31 and a first sensor 51 on another end of the feeder 31. Thereupon, when one of these sensors detects there are material pieces 25 in the feeding device 31, the distributer 32 on the discharging platform 12 is then rotated a feeding angle $\theta_\alpha$, where $\theta_\alpha$ may be in the range from 25 to 45 degrees, and preferably is 30 degrees, allowing the material pieces 25 in the feeding tube 24 to be discharged when the feeding tube 24 is inclined a certain degree, and the distributer 32 can also rotated the feeding angle $\theta_\alpha$, allowing the distributing device 32 to receive material pieces smoothly. Furthermore, the distributer 32 can deal with a number of material pieces 25 at the same time so as to increase the processing speed.

Figure 9:
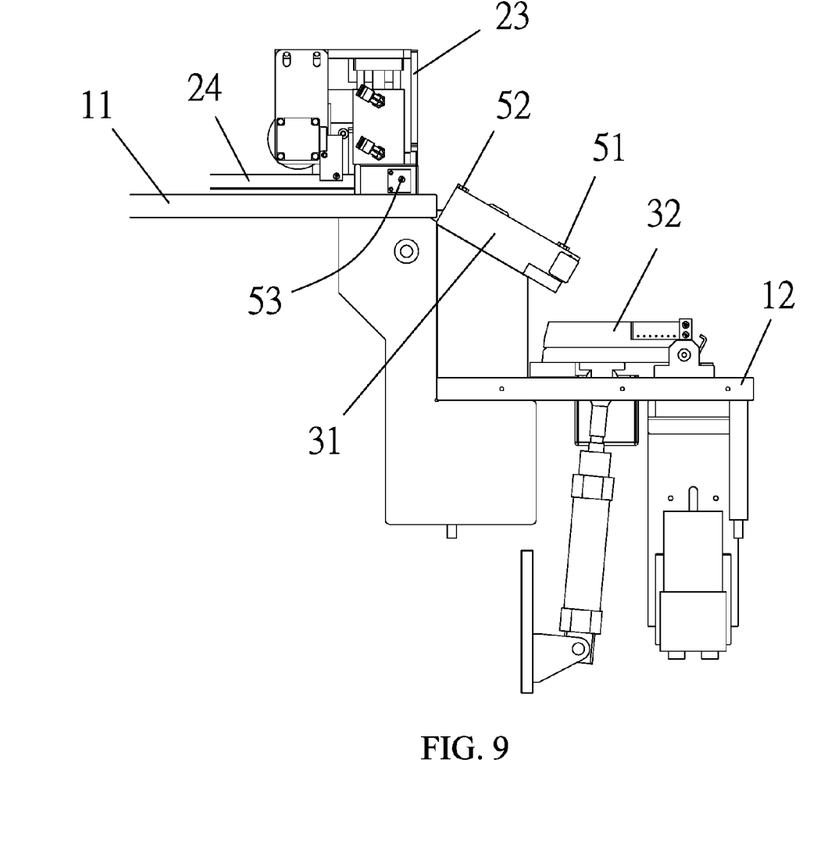
FIG. 9 is a schematic view of the present invention upon object discharging.
Figure 10:
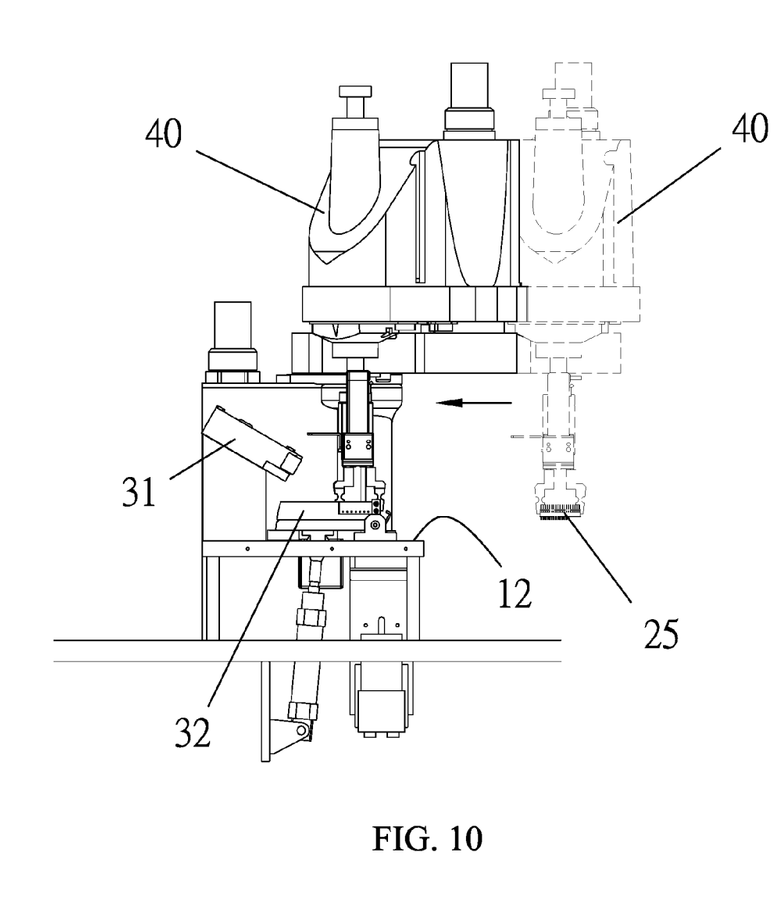
FIG. 10 is a schematic view of a robotic arm gripping material pieces according to the present invention.

Continuously, referring to FIGS. 9 and 10, in order to allow the robotic arm 40 to grip the material piece 25, the distributer 32 will be rotated a discharging angle which is 0 degrees after the material pieces are separated in the distributer 32. Thereafter, the robotic arm 40 with the four-axis motor having the level and perpendicular displacement devices is moved levelly to above the distributing device and grips the material piece 25 conveniently with the perpendicular placement device.

Figure 11:
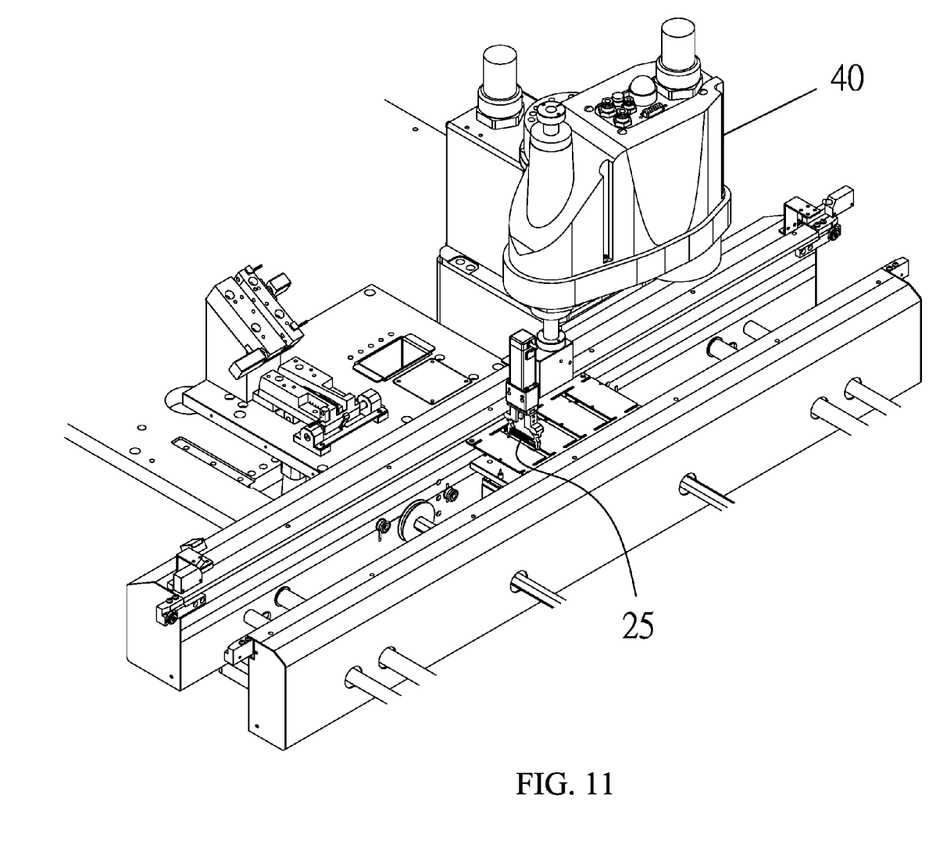
FIG. 11 is a schematicall perspective view of the robotic arm of the present invention upon automatic plug of the material pieces.

Finally, referring to FIG. 11, the automatic plug of the material piece 25 can be further carried out through the level and perpendicular displacement devices of the robotic arm with four-axis motor. Whereby, the present invention is simple in structure and procedure, low in cost and fully automatic in material piece plug.

We claim:

1. An automatic staged object feeding and discharging system, comprising;
   a table, configured with a feeding platform and discharging platform;
   a feeding device, configured on an object platform, and having a displacement device and at least one feeding tube therein, said each feeding tube being positioned above said displacement device, at least one feeding tube angle deflection device having an angle deflection angle being configured on said displacement device, and a pouring device being configured on one side of a front end of said feeding device, said pouring device allowing said feeding tube to be in connection therewith;
   a staged feeding and discharging device, configured on said discharging platform, and having a feeder and discharger, said feeder being positioned on one end of said feeding platform and corresponding to said pouring device, said feeder being inclined at an angle, a distributer being coupled pivotally to said discharging platform, a track being configured inside said distributer, said track being configured with a low separation protrusion, a high separation protrusion being configured on said low separation protrusion, said high separation protrusion being configured on a middle section of said low separation protrusion, and a wall face being respectively configured on two side ends of said track;
   a robotic arm, configured on one side of said discharging platform, and having a level displacement device and perpendicular displacement device.

2. The system according to claim 1, wherein each of said low and high separation protrusions is widen gradually from front to back.

3. The system according to claim 1, wherein a separation angle is ranged from 3 to 8 degrees.

4. The system according to claim 3, wherein said separation angle is 4 degrees.

5. The system according to claim 1, wherein at least one exhaust vent is respectively configured on said wall faces positioned on said two side ends of said track.

6. The system according to claim 1, wherein said distributer has a feeding angle ranged from 25 to 45 degrees.

7. The system according to claim 6, wherein said feeding angle is 30 degrees.

8. The system according to claim 1, wherein said distributer has a discharging angle, said discharging angle being 0 degrees.

9. The system according to claim 1, wherein said deflection angle is 45 degrees.

* * * * *